UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

FINISH-REMOVER.

1,049,466.  Specification of Letters Patent.  Patented Jan. 7, 1913.

No Drawing.   Application filed May 28, 1907. Serial No. 376,062.

*To all whom it may concern:*

Be it known that I, CARLETON ELLIS, a citizen of the United States, residing at Larchmont, in the county of Westchester and State of New York, have made certain new and useful Inventions in Finish-Removers, of which the following is a specification.

This invention relates to finish removers and relates especially to removers having antiseptic or germicide properties and preferably comprising non-volatile antiseptic agents.

Many antiseptic agents may be used in removers with advantage where the same are to be used in railway cars or similar ways, non-volatile, non-corrosive antiseptics which will not injure the wood or other material being, of course, preferable. Boric acid is a very desirable antiseptic agent of this character, as well as benzoic acid and salicylic acid, as are also many compounds or salts thereof, such as benzoates and salicylates of soda. Solid polymerized formaldehyde or paraformaldehyde is also desirable, a few per cent. of this energetic antiseptic being sufficient for remover use. In many cases it is desirable to combine several of these antiseptic agents as they give when combined more beneficial results and have special action on certain special bacteria. When several of these antiseptic acids or agents are heated or fused together physical and chemical changes seem to take place which probably account for their increased antiseptic action. It is, of course, desirable in all cases that these antiseptic agents shall be soluble in the ordinary finish solvents employed in removers so as to be thoroughly incorporated with the remover ingredients. Penetrating finish solvents, that is, solvents of a generally benzolic character or action in removers may be used, including benzol and its homologues and somewhat similar petroleum solvents, benzin, gasolene, and so forth, and also carbon bisulfid and carbon tetrachlorid and other chlorinated compounds, such as acetylene chlorid. Loosening finish solvent material, that is, solvents having a generally alcoholic character for action in removers, may also be used when desired, such as the strict alcohols, methyl, ethyl, propyl, butyl and benzyl alcohol in their cheaper forms when desired, including denatured alcohol and also other solvents of a generally alcoholic character, such as methyl acetone, acetone and other ketones, acetone oil, wood tar oil, resin oil, and so forth, as well as various derivatives thereof. Although not necessary in all cases suitable stiffening material may be employed in the remover, such as wood flour, starch, whiting, infusorial earth, and soapy or waxy bodies, such as ceresin, paraffin, beeswax, ozocerite and nitrocellulose, many of which form effective evaporation retarding films over the exposed surface of the remover when in use. The various ingredients of the remover are preferably thoroughly incorporated by agitation at a suitable gentle heat the stiffening material when of a soapy or waxy character and also the antiseptic material being preferably first dissolved in the more energetic solvent material therefor, although this is not necessary in all cases. A suitable illustrative remover of this character may comprise benzol 35 parts, denatured alcohol 40 parts, boric acid 3 parts, benzoic acid 4 parts and ceresin wax 1 part. Another illustrative remover may comprise benzol 30 parts, wood alcohol 65 parts, boric acid 3 parts and wax, such as ceresin or paraffin wax 2 parts. Still another illustrative remover may comprise denatured alcohol 5 parts, wood tar oil 20 parts, boric acid 1 part and benzoic acid 1 part.

Having described this invention in connection with a number of illustrative ingredients and formulas to the details of which disclosure it is not, of course, to be limited, what is claimed is—

1. The finish remover comprising approximately benzol 40 parts, denatured alcohol 35 parts, boric acid 3 parts, benzoic acid 4 parts and ceresin 1 part.

2. The finish remover comprising approximately benzol 40 parts, denatured alcohol 35 parts, boric acid 3 parts, benzoic acid 4 parts and waxy stiffening material.

3. The finish remover comprising approximately benzol 40 parts, denatured alcohol 35 parts, boric acid 3 parts and benzoic acid 4 parts.

4. The finish remover comprising approximately benzol 40 parts, denatured alcohol 35 parts, and combined non-corrosive antiseptic material miscible therewith formed from boric acid 3 parts and benzoic acid 4 parts.

5. The finish remover comprising composite finish solvent material including an alcohol, incorporated waxy material and non-volatile, non-corrosive antiseptic material including boric acid miscible therewith.

6. The substantially non-aqueous finish remover consisting substantially of about 75 parts of penetrating and alcoholic finish solvent material and incorporated miscible non-corrosive antiseptic material formed from boric acid 3 parts and benzoic acid 4 parts.

CARLETON ELLIS.

Witnesses:
 HARRY L. DUNCAN,
 JAMES N. CATLOW.